United States Patent
Balasubramaniam et al.

(10) Patent No.: US 10,794,870 B2
(45) Date of Patent: Oct. 6, 2020

(54) WAVEGUIDE TECHNIQUE FOR THE SIMULTANEOUS MEASUREMENT OF TEMPERATURE DEPENDENT PROPERTIES OF MATERIALS

(71) Applicant: INDIAN INSTITUTE OF TECHNOLOGY MADRAS, Chennai, State of Tamil Nadub (IN)

(72) Inventors: Krishnan Balasubramaniam, Chennai (IN); Periyannan Suresh, Chennai (IN)

(73) Assignee: INDIAN INSTITUTE OF TECHNOLOGY MADRAS, Tamil Nadub (IN)

( * ) Notice: Subject to any disclaimer, the term of this patent is extended or adjusted under 35 U.S.C. 154(b) by 84 days.

(21) Appl. No.: 14/903,002

(22) PCT Filed: Jul. 14, 2014

(86) PCT No.: PCT/IN2014/000467
§ 371 (c)(1),
(2) Date: Jan. 5, 2016

(87) PCT Pub. No.: WO2015/008299
PCT Pub. Date: Jan. 22, 2015

(65) Prior Publication Data
US 2016/0153938 A1    Jun. 2, 2016

(30) Foreign Application Priority Data
Jul. 16, 2013  (IN) .......................... 3170/CHE/2013

(51) Int. Cl.
*G01N 29/24* (2006.01)
*G01N 29/024* (2006.01)
(Continued)

(52) U.S. Cl.
CPC ....... *G01N 29/2462* (2013.01); *G01N 29/024* (2013.01); *G01N 29/032* (2013.01);
(Continued)

(58) Field of Classification Search
CPC ........... G01N 29/2462; G01N 29/2475; G01N 29/2487; G01N 29/2437–245
(Continued)

(56) References Cited

U.S. PATENT DOCUMENTS 2,707,391 A * 5/1955 McSkimin ........... G01N 11/162
73/54.24
3,010,318 A * 11/1961 Mongan ................. G01B 17/00
73/290 V
(Continued)

FOREIGN PATENT DOCUMENTS

WO     2009/152143 A1    12/2009

OTHER PUBLICATIONS

Cegla et al, Material property measurement using the quasi-Scholte mode—A waveguide sensor, The Journal of the Acoustical Society of America 117, 1098 (2005); doi: 10.1121/1.1841631.*
(Continued)

*Primary Examiner* — David L Singer
(74) *Attorney, Agent, or Firm* — Maschoff Brennan; Jonathan M. Benns

(57) ABSTRACT

A method and a system is provided for measuring mechanical properties of a solid material using standard ultrasonic wave modes propagated in the solid material, which forms a waveguide, where the waveguide is encased a fluid media. The method and system can be at high temperatures. The system includes an ultrasonic transducer placed at one end of the waveguide that generates multiple wave modes, which travel in different paths along a length of the waveguide and are reflected. The system includes a set of corre-
(Continued)

sponding sensors for detecting the amplitude and time of flights, and includes a processor means to analyze the detected signals.

21 Claims, 14 Drawing Sheets

(51) Int. Cl.
| | |
|---|---|
| *G01N 29/032* | (2006.01) |
| *G01N 29/22* | (2006.01) |
| *G01N 29/07* | (2006.01) |
| *G01N 29/11* | (2006.01) |

(52) U.S. Cl.
CPC ............. *G01N 29/07* (2013.01); *G01N 29/11* (2013.01); *G01N 29/228* (2013.01); *G01N 29/223* (2013.01); *G01N 29/2437* (2013.01); *G01N 2291/011* (2013.01); *G01N 2291/015* (2013.01); *G01N 2291/022* (2013.01); *G01N 2291/023* (2013.01); *G01N 2291/02818* (2013.01); *G01N 2291/02827* (2013.01); *G01N 2291/02836* (2013.01); *G01N 2291/02881* (2013.01); *G01N 2291/042* (2013.01); *G01N 2291/044* (2013.01)

(58) Field of Classification Search
USPC .......................... 73/579, 866.5; 333/142–143
See application file for complete search history.

(56) References Cited

U.S. PATENT DOCUMENTS

| | | | | | |
|---|---|---|---|---|---|
| 3,350,942 | A | * | 11/1967 | Peltola | G01K 11/24 374/119 |
| 3,534,609 | A | * | 10/1970 | Grenfell | G01K 11/24 374/119 |
| 3,636,754 | A | * | 1/1972 | Lynnworth | G01L 11/04 73/597 |
| 4,336,719 | A | * | 6/1982 | Lynnworth | G01F 1/667 73/861.27 |
| 4,571,693 | A | * | 2/1986 | Birchak | E21B 47/101 702/54 |
| 4,676,663 | A | * | 6/1987 | Tehon | G01K 11/24 374/117 |
| 4,762,425 | A | * | 8/1988 | Shakkottai | G01K 11/24 367/902 |
| 4,779,452 | A | * | 10/1988 | Cohen-Tenoudji | G01N 11/00 73/54.41 |
| 4,894,806 | A | * | 1/1990 | Jen | G01H 3/125 367/103 |
| 5,009,104 | A | * | 4/1991 | Johnson | G01N 29/11 264/257 |
| 5,828,274 | A | * | 10/1998 | Jen | B06B 3/00 333/143 |
| 6,047,602 | A | * | 4/2000 | Lynnworth | G01F 1/662 73/632 |
| 6,296,385 | B1 | * | 10/2001 | Balasubramaniam | G01K 11/22 374/119 |
| 2009/0314088 | A1 | * | 12/2009 | Djordjevic | G01N 29/028 73/602 |
| 2013/0260469 | A1 | * | 10/2013 | Djordjevic | G01N 29/028 436/85 |

OTHER PUBLICATIONS

Rose, An Introduction to Ultrasonic Guided Waves, 4th Middle East NDT Conference and Exhibition, Kingdom of Bahrain, Dec. 2007.*
Vogt et al, Measurement of the Material Properties of Viscous Liquids Using Ultrasonic Guided Waves, IEEE Transactions on ultrasonics, ferroelectrics, and frequency control, vol. 51, No. 6, Jun. 2004.*
Shepard et al, Measurements of Density and Viscosity of One- and Two-Phase Fluids with Torsional Waveguides, IEEE transactions on ultrasonics, ferroelectrics, and frequency control, vol. 46, No. 3, May 1999.*
Vogt et al, The scattering of guided waves in partly embedded cylindrical structures, The Journal of the Acoustical Society of America 113, 1258 (2003); doi: 10.1121/1.1553463.*
Ai et al, Theoretical Analyses and Numerical Simulations of the Torsional Mode for Two Acoustic Viscometers with Preliminary Experimental Tests, IEEE Transactions on ultrasonics, ferroelectrics, and frequency control, vol. 55, No. 3, Mar. 2008.*
Fan, Thesis: Applications of Guided Wave Propagation on Waveguides with Irregular Cross-section, Jun. 2010, Imperial College London.*
Izadpanah et al, Using Ultrasonic Guided Waves in Evaluation of Pipes, The 2nd International Conference on Technical Inspection and NDT (TINDT2008)—Oct. 2008—Tehran, Iran.*
Science Learning Hub, What are ceramics?, Apr. 27, 2010.*
Matsumoto, Takahiro, et al. "Measurement of High‐Temperature Elastic Properties of Ceramics Using a Laser Ultrasonic Method." Journal of the American Ceramic Society 84.7 (2001): 1521-1525.
Gondard, C., M-H. Nadal, and C. Hermerel. "Three Ultrasonic Devices for the Elastic Moduli Determination at High Temperatures." Review of Progress in Quantitative Nondestructive Evaluation 17 (1998): 867-874.
Peterson, R. G. "An ultrasonic method for studying elastic moduli as a function of temperature." NASA Tech Brief 69-10082 (1969).
International Search Report and Written Opinion of the International Searching Authority; PCT/IN2014/000467.

* cited by examiner

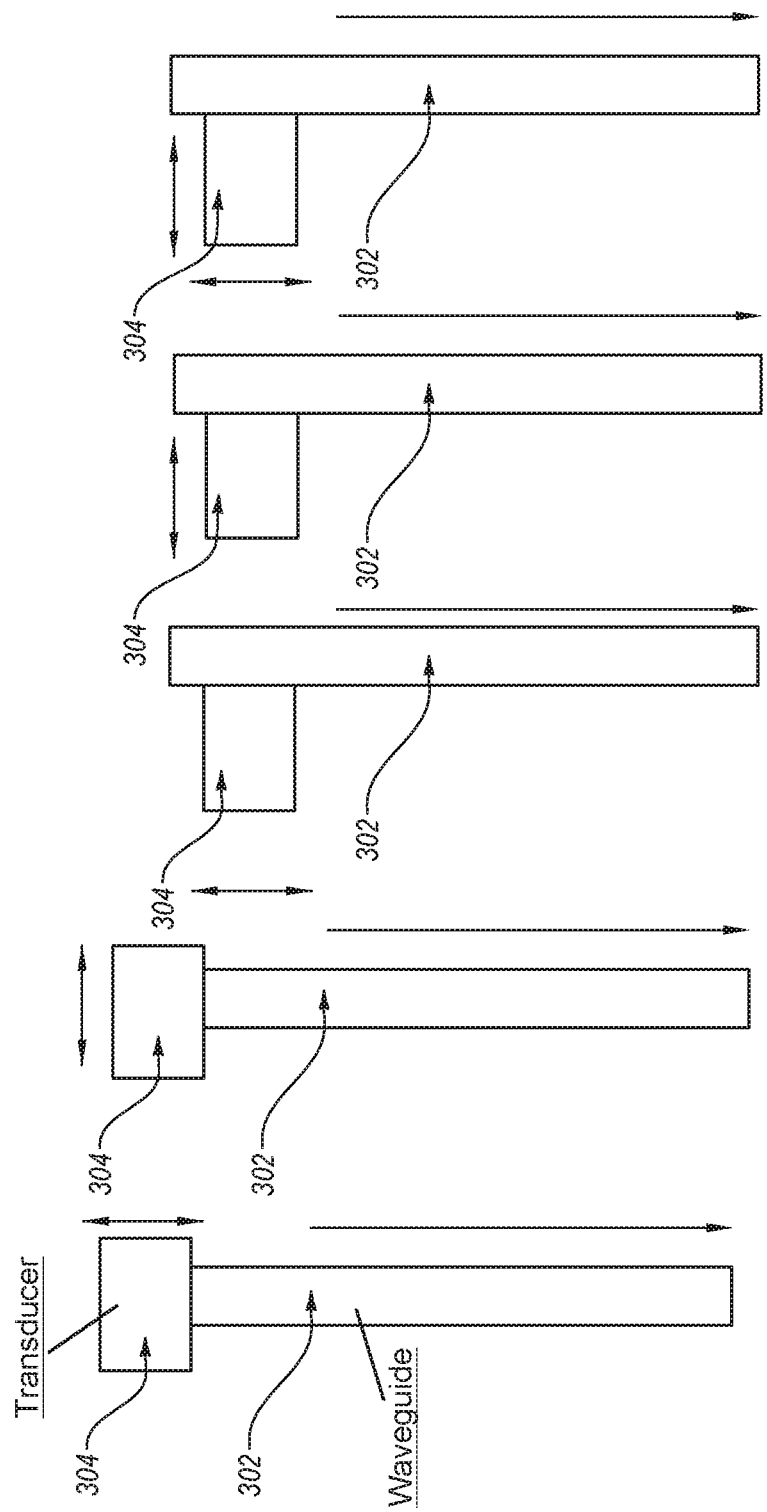

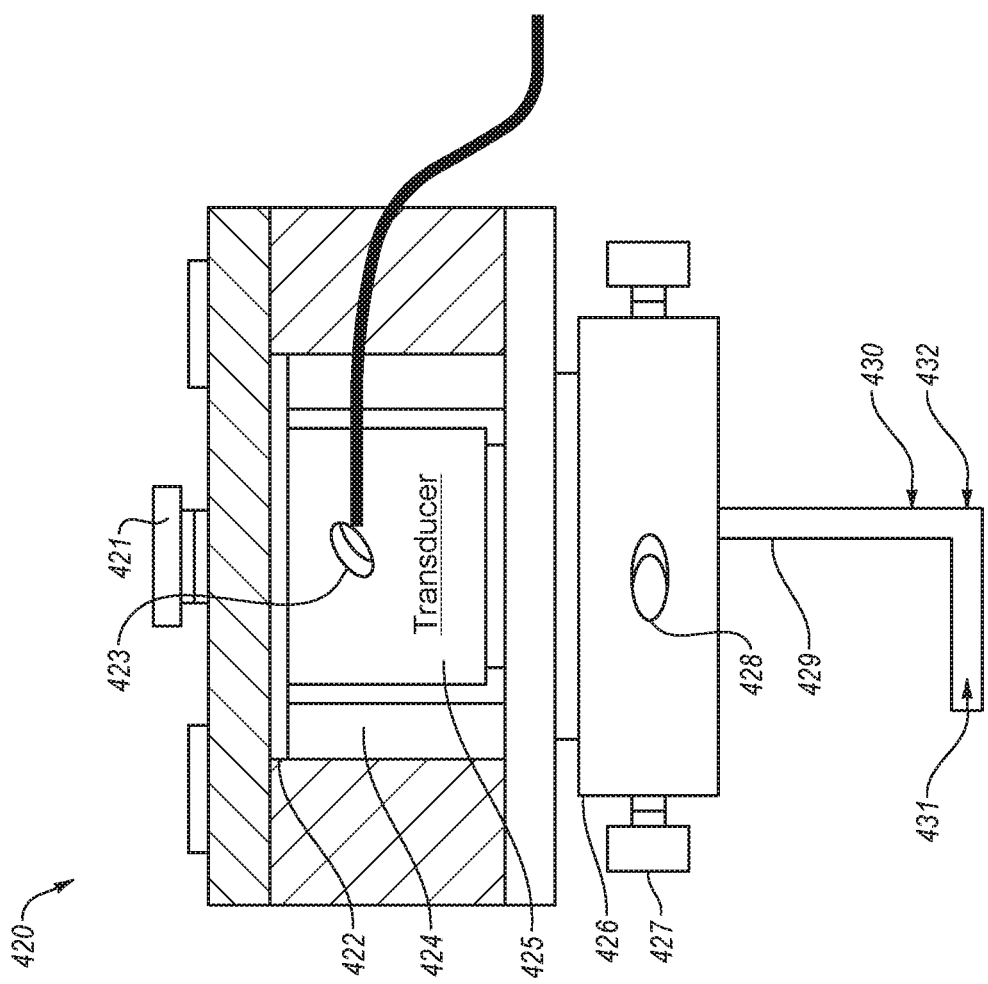

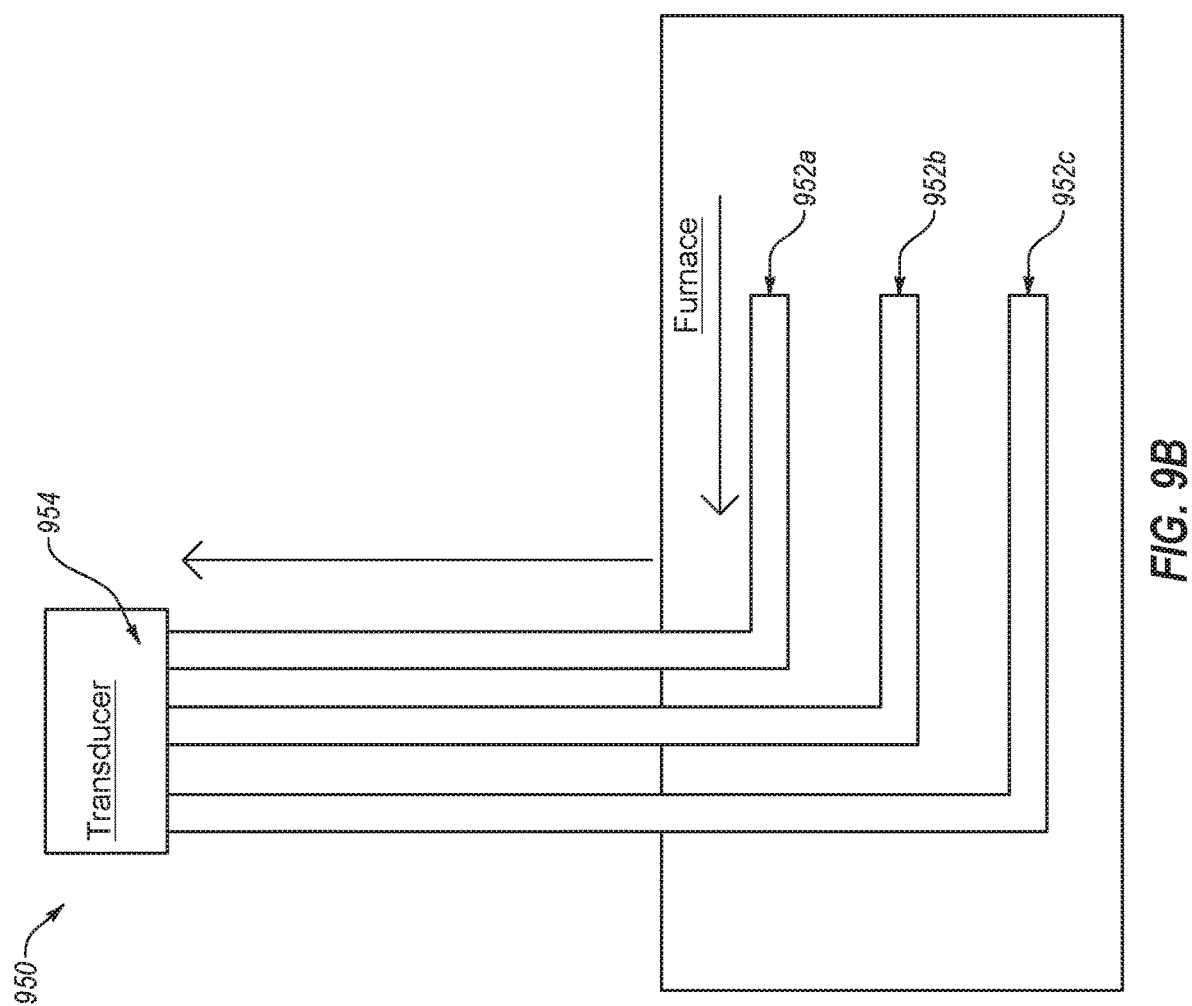

WAVEGUIDE TECHNIQUE FOR THE SIMULTANEOUS MEASUREMENT OF TEMPERATURE DEPENDENT PROPERTIES OF MATERIALS

CROSS-REFERENCE TO RELATED APPLICATIONS

This patent application is a nationalization of PCT/IN2014/000467 filed Jul. 14, 2014, which claims priority to Indian Patent Application No. 3170/CHE/2013 filed Jul. 16, 2013.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

(1) Field of the Invention

This technology is in the area of sensors and sensing techniques for material property and process conditions measurement. This technology has specific applications in the measurement of material properties that are temperature dependent and particularly at high temperatures.

(2) Description of Related Art Including Information Disclosed Under 37 CFR 1.97 and 1.98

Some of the prior arts that are relevant in the field of invention are given below.

2001: Apparatus and method for high temperature viscosity and temperature measurements; U.S. Pat. No. 6,296,385 B1.

1999: Ultrasonic buffer/waveguide; EP 0935798 A1 (text from WO/1998019296 A1).

1989: Ultrasonic temperature sensors, and ultrasonic waveguide connectors for use therewith; EP 0351050 B1.

2009: Remote ultrasonic transducer system; EP 2091669 A1 (text from WO/2008060153 A1).

1992: Distributed temperature sensor; EP 0465029 A2.

2012: Differential ultrasonic waveguide cure monitoring probe; U.S. Pat. No. 8,291,744 B2.

2010: Ultrasonic sensor for measuring flow rates in liquid melts; EP 2158456 A2 (text from WO/2008152031 A2).

1998: U.S. Pat. No. 5,828,274.

2010: Ultrasonic non-destructive testing; EP 2266714 A1.

2006: Device and method for ultrasonically determining the dynamic elastic modulus of a material; EP 1726947 A1.

2008: Device and method for ultrasonically determining the dynamic elastic modulus of a material; EP 1875223 A1 (text from WO/2006111559 A1).

Balasubramaniam, K., V. V. Shah, D. Costley, G. Bourdeaux, and J. P. Singh, "High Temperature Ultrasonic Sensor for the Simultaneous Measurement of Viscosity and Temperature of Melts" Review of Scientific Instruments, Vol. 70 (12), pp. 1-6, (1999).

Balasubramaniam, K., V. V. Shah, D. Costley, G. Bourdeaux, and J. P. Singh, "Viscosity and Temperature Measurements at very High Temperature by Ultrasound Reflection" U.S. Pat. No. 6,296,385, (2001).

Balasubramaniam, K., V. V. Shah, G. Boudreaux, R. D. Costley, C. Menezes, and J. P. Singh, "Temperature and Viscosity in-situ Sensor for Hostile Processes" Review of Progress in Quantitative Nondestructive Evaluation, Vol. 18B, pp. 1163-1170, (1999).

Faber, A. J., F. Simonis, R. Breeuwer and Henk de wall, "Application of ultrasonic measuring techniques in industrial glass melting" Glastech. Ber. 64Nr. 5, (1991).

Shah, V. V., K. Balasubramaniam, "Measuring Newtonian Viscosity from the Phase of Reflected Ultrasonic Shear wave", Ultrasonics, Vol. 38, pp. 921-927 (2000).

Shah, V. V., K. Balasubramaniam, R. D. Costley, and J. P. Singh, "Sensor Development for High Temperature Viscosity Measurement" Review of Progress in Quantitative Nondestructive Evaluation, Vol. 17A, pp. 859-866. (1998).

Shah, V. V., and K. Balasubramaniam, "Effect of viscosity on ultrasound wave reflection from a solid/liquid interface," Ultrasonics, Vol. 34, No. 8, pp. 817-24, (1996), Plenum Press, N.Y., Vol. 17A, pp. 859-866, (1996).

Sheen, S. H., H-T. Chien, and A. C. Raptis, "An In-Line Ultrasonic Viscometer", Review of Progress in Quantitative Nondestructive Evaluation, Vol. 14A, pp. 1151-57, (1995).

Sheen, S. H., H. T. Chien and A. C. Raptis, "Measurement of shear impedances of viscoelastic fluids", IEEE Ultrasonics Symposium Proceedings, (IEEE, New. York) Vol. 1, pp. 453, (1996).

T. K. Vogt, M. J. S. Lowe, and P. Cawley, "Measurement of the Material Properties of Viscous Liquid using Ultrasonic Guided Waves" IEEE Transaction on Ultrasonics, Ferroelectrics, and Frequency Control, Vol. 51, No. 6, pp 737-747, (2004).

The measurement of temperature dependent properties of material is critical. This is required for both solid and fluid materials.

BRIEF SUMMARY OF THE INVENTION

A method is provided for measuring mechanical properties of a solid material using guided ultrasonic wave modes that can be used for characterizing the solid material, wherein the solid material being characterized forms a waveguide encased in a fluid media. The method comprises: generating a plurality of guided ultrasonic wave modes using an ultrasonic transducer at one end of the waveguide, which plurality of wave modes travel in different paths along the length of the waveguide to interact with a corresponding end of the waveguide, and the wave modes get reflected as a plurality of reflected signals from the corresponding end/regions of the waveguide; detecting a plurality of ultrasonic amplitudes and time of flights from the plurality of reflected signals; and analyzing and calculating a plurality of properties of the waveguide material and the surrounding fluid using the detected plurality of ultrasonic amplitudes and time of flights. Alternative, the solid material may be a solid or a fluid.

A method is provided for measuring mechanical properties of a material using guided ultrasonic wave modes that can be used for characterizing the material, wherein the material being characterized forms a waveguide encased in a fluid media. The method comprises: generating a plurality of guided ultrasonic wave modes using an ultrasonic transducer at one end of the waveguide, which plurality of wave modes travel in different paths along the length of the waveguide to interact with a corresponding end/regions of the waveguide, and the wave modes get reflected as a plurality of reflected signals from the corresponding end of the waveguide; detecting a plurality of ultrasonic amplitudes and time of flights from the plurality of reflected signals; and analyzing and calculating a plurality of properties of the waveguide material and the surrounding fluid using the detected plurality of ultrasonic amplitudes and time of flights. Here, solid material may be a solid or a fluid. In one aspect, the plurality of properties may be at least physical properties, such as elastic properties of the material, viscoelastic properties of the material, density of the material, viscosity of the material, and temperature of the material over a range of temperatures.

The method may comprise arranging a plurality of the materials, such that the method will provide gradients of properties of the material physical properties, such as elastic properties of the material, viscoelastic properties of the material, density of the material, viscosity of the material, and temperature of the material over a range of temperatures. In one aspect of the method, the path includes at least one bend at one end. In one aspect of the method, the path includes at least one notch at one end. In one aspect of the method, the path includes a plurality of bends and/or notches at one end.

A system is provided for measuring mechanical properties of a solid material using standard ultrasonic wave modes for characterizing the solid material, wherein the solid material forms a waveguide encased in a fluid media. The system comprises: an ultrasonic transducer positioned at one end of the wave guide to generate a plurality of ultrasonic wave modes, wherein each of the wave modes travels in a different path along the length of the waveguide and gets reflected therefrom; a plurality of sensors for detecting a plurality of ultrasonic amplitudes and time of flights from the plurality of reflected signals; and a processor means for analyzing and calculating a plurality of properties of the wave guide material and the surrounding fluid.

A system is provided for measuring mechanical properties of a material using standard ultrasonic wave modes for characterizing the material, wherein the material forms a waveguide encased in a fluid media. The system comprises: an ultrasonic transducer positioned at one end of the waveguide to generate a plurality of ultrasonic wave modes, wherein each of the wave modes travels in a different path along the length of the waveguide and gets reflected therefrom; a plurality of sensors for detecting a plurality of ultrasonic amplitudes and time of flights from the plurality of reflected signals; and a processor means for analyzing and calculating a plurality of properties of the wave guide material and the surrounding fluid. In one aspect, the material may be a solid or a fluid. In one aspect, the properties of the material means at least physical/elastic/viscoelastic properties of the material, density, viscosity and temperature over a range of temperatures. In one aspect, the system can comprise of plurality of systems which will provide gradients of properties of material means at least physical/elastic/ viscoelastic properties of the material, density, viscosity and temperature over a range of temperatures. In one aspect, the waveguide includes at least one bend at one end. In one aspect, the waveguide includes at least one notch at one end. In one aspect, the waveguide includes a plurality of bends and/or notches at one end.

BRIEF DESCRIPTION OF THE SEVERAL VIEWS OF THE DRAWING(S)

FIGS. 3A, 3B, 3C, 3D, and 3E show some typical positioning of the piezo-electric based transducers on the waveguide.

Figure 4A:
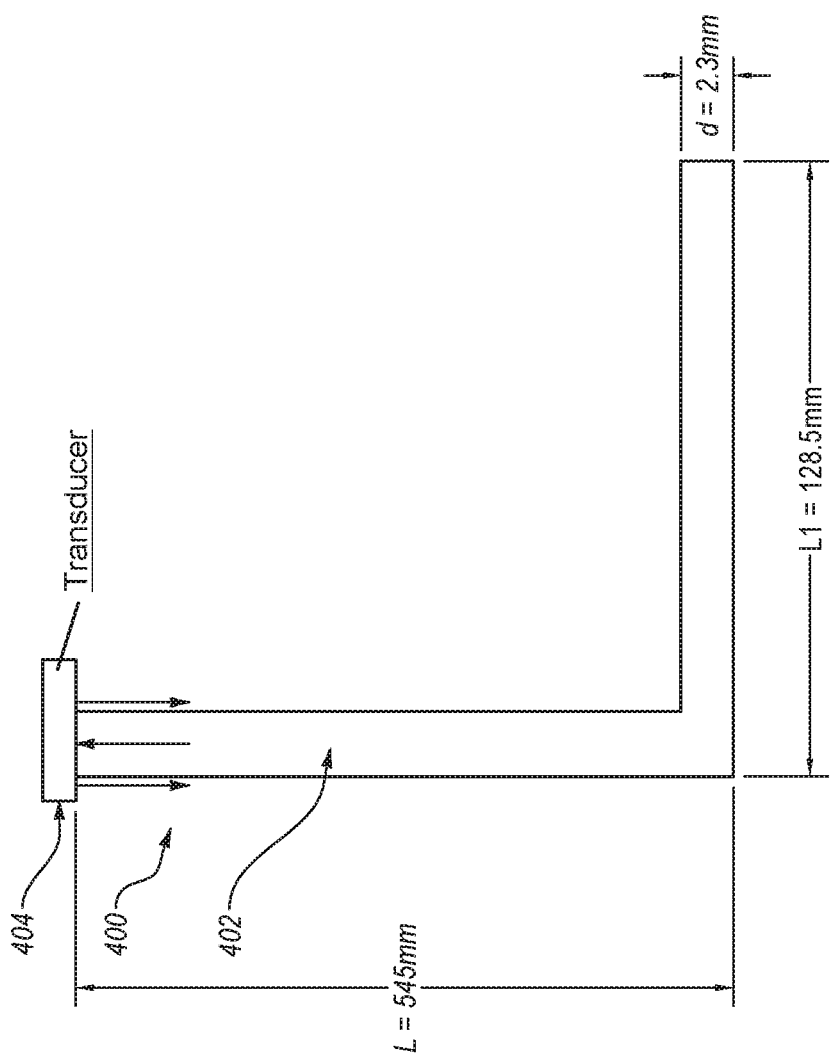

FIG. 4A shows the waveguide embodiment using an L bend, which was employed in the study reported here.

FIG. 4B shows the sensor along with a holder for the piezo-crystal transducer for the generation of the ultrasonic wave modes in the waveguide.

Figure 4C:
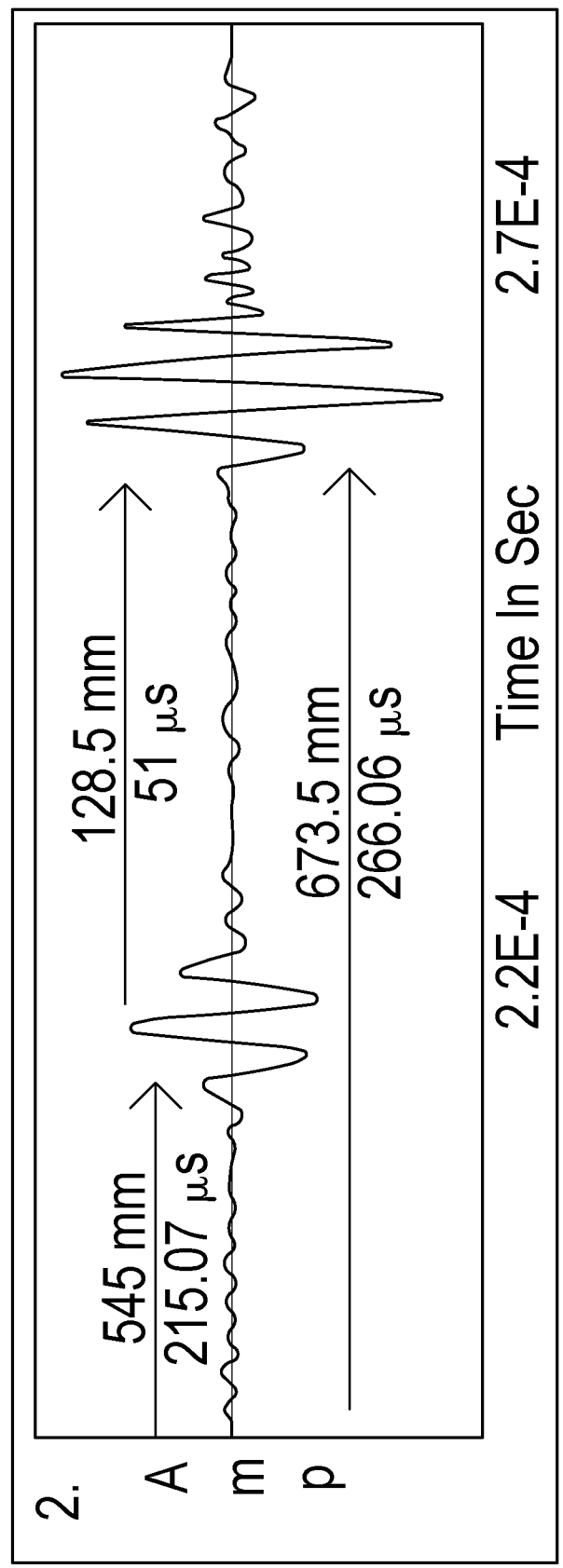

FIG. 4C shows a graph of a typical time domain signal (also called an A-scan signal).

Figure 5:
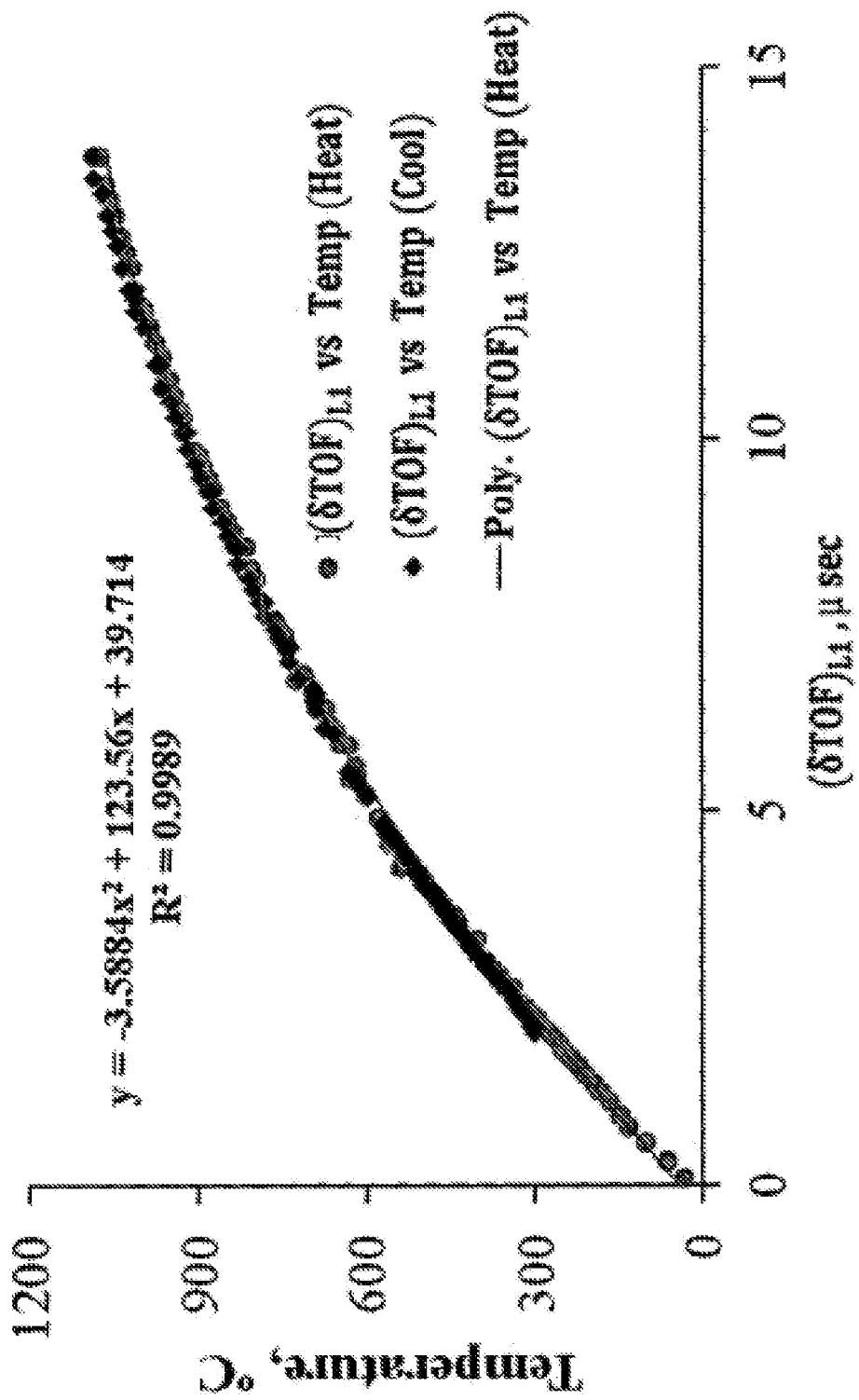

FIG. 5 shows the δTOF for the L (0,1) mode vs temperature as measured using thermocouples and the polynomial fit curve.

Figure 6:
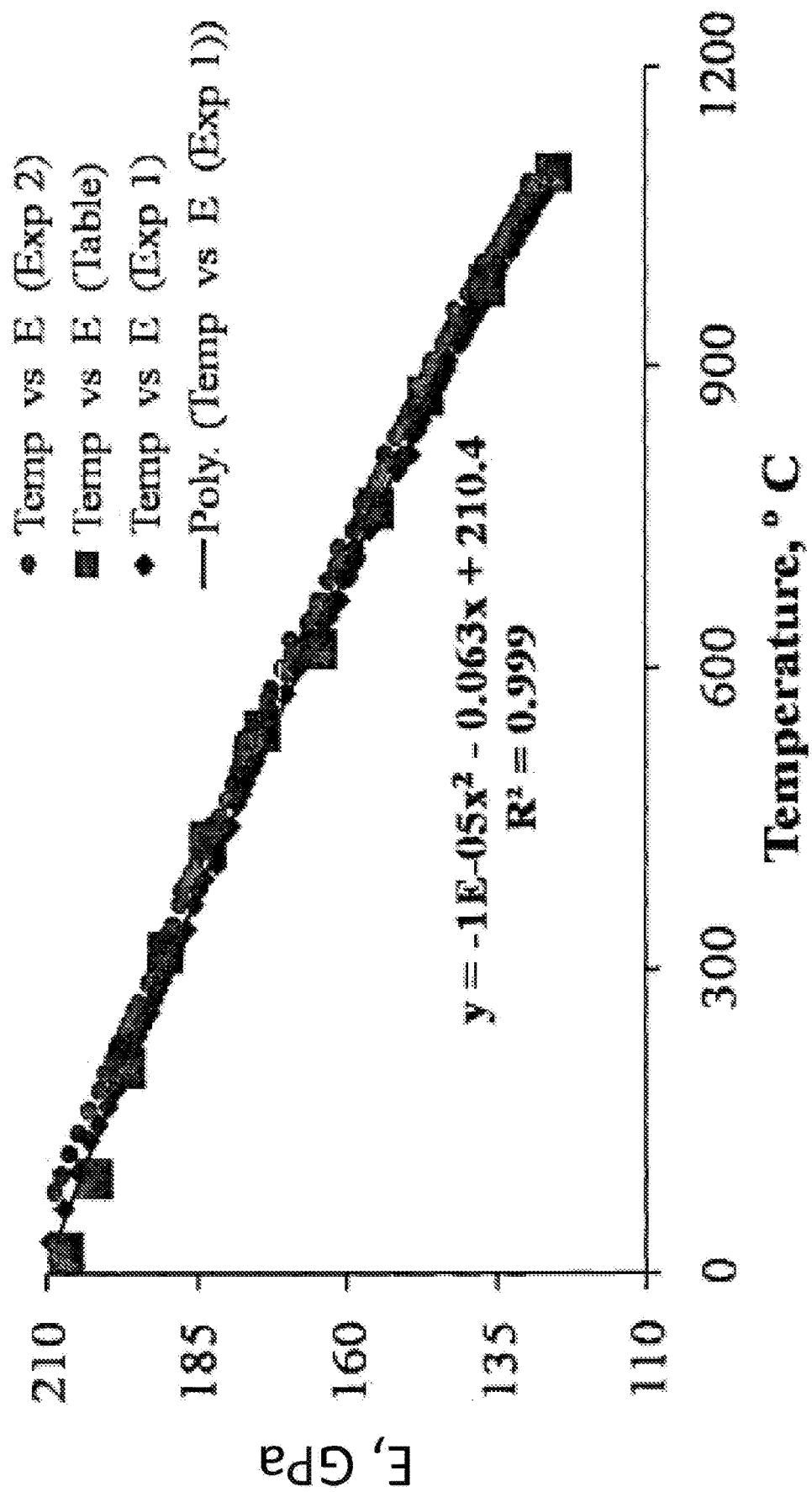

FIG. 6 shows the E vs Temp for Inconel-690 as measured using the L(0,1) waveguide sensor made from Inconel-690, where two separate experimental measurements are shown here and compared with data obtained from literature (Table 4, page 2 from Publication Number SMC-079, Copyright © Special Metals Corporation, 2009 (October 09)).

Figure 7:
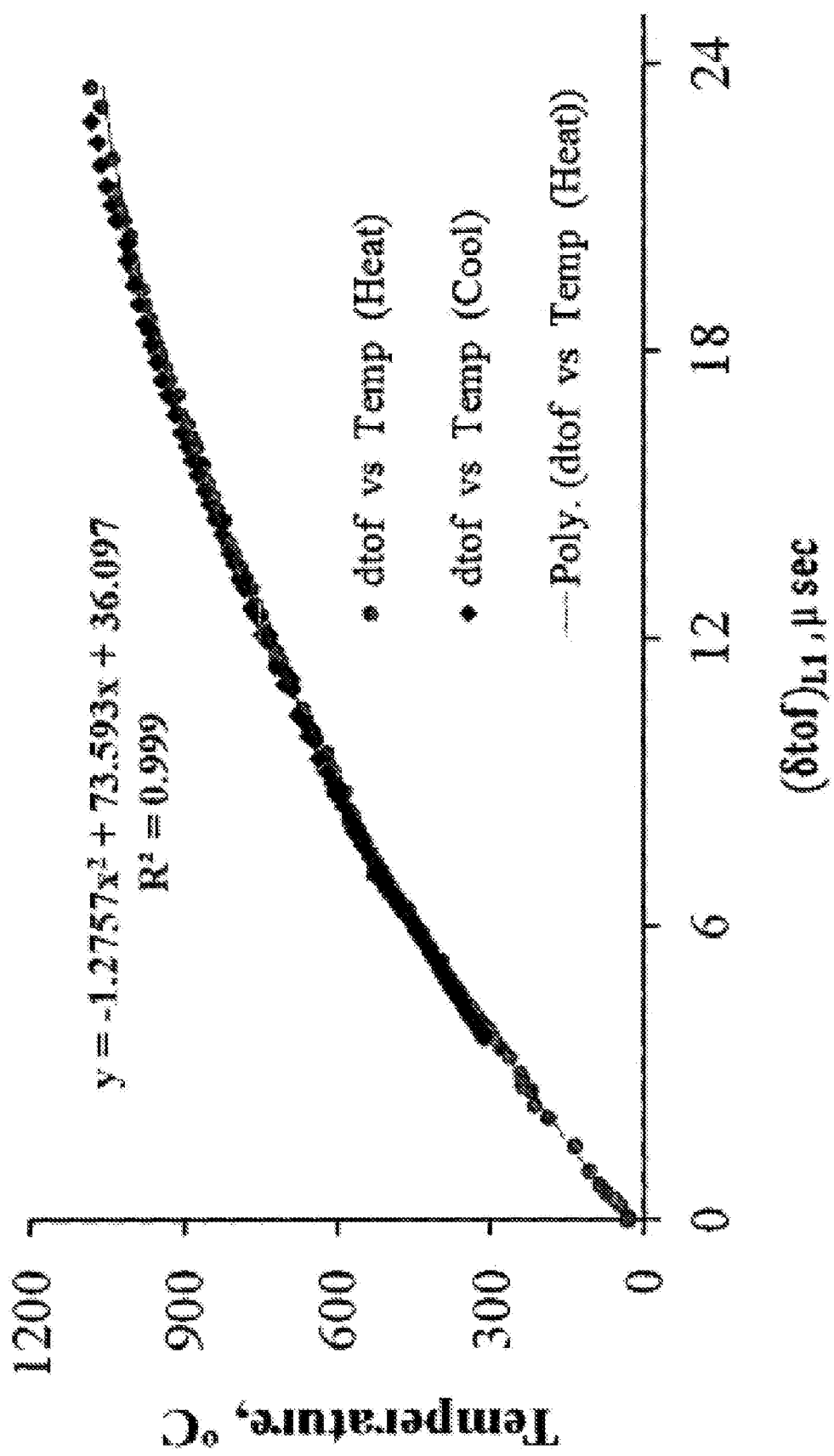

FIG. 7 shows the δtof for the T(0,1) mode vs temperature as measured using thermocouples and the polynomial fit curve.

Figure 8:
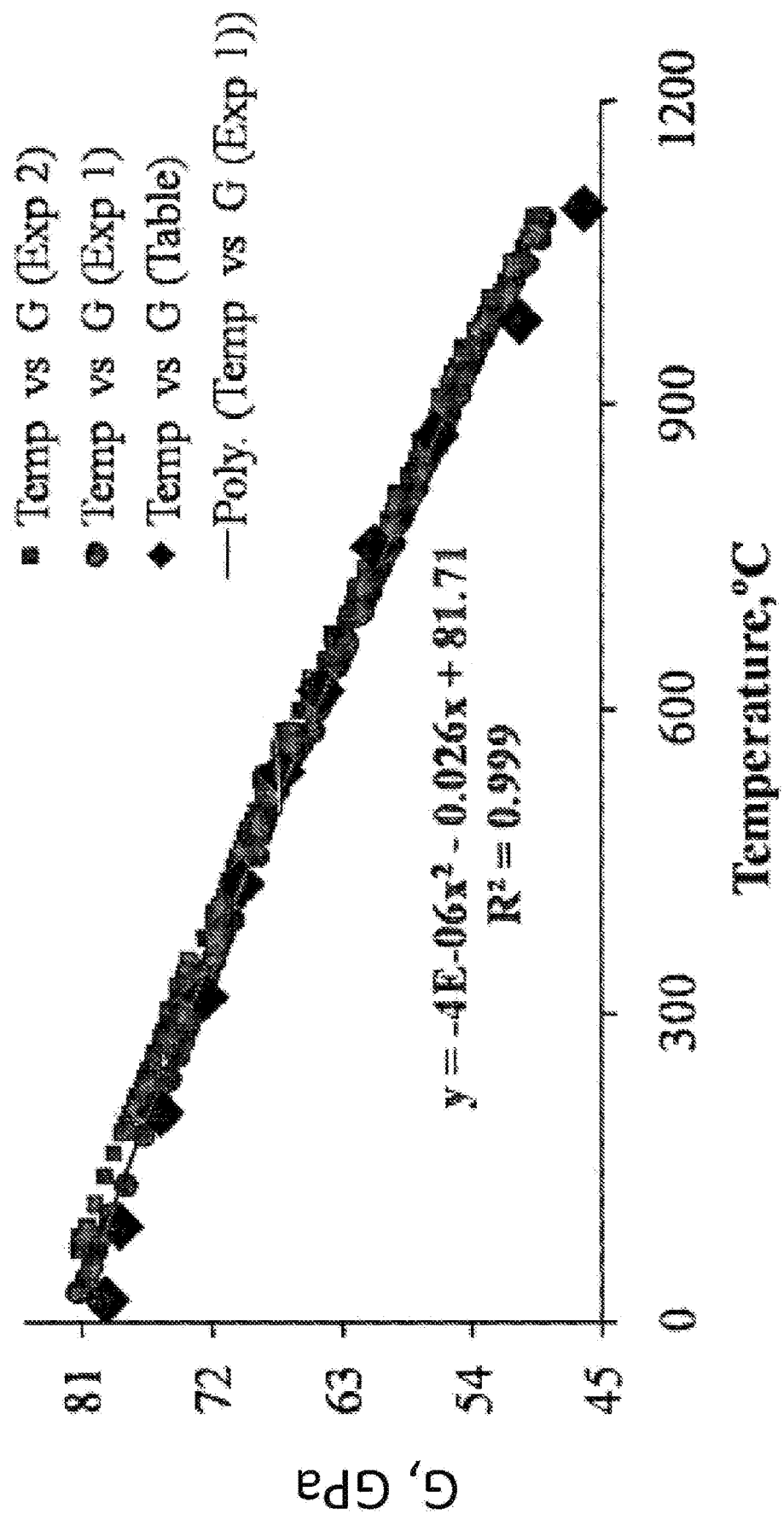

FIG. 8 shows the G vs Temp for Inconel-690 as measured using the T(0,1) waveguide sensor made from Inconel-690. Two separate experimental measurements are shown here and compared with data obtained from literature (Table 4, page 2 from Publication Number SMC-079, Copyright © Special Metals Corporation, 2009 (October 09)).

Figure 9A:
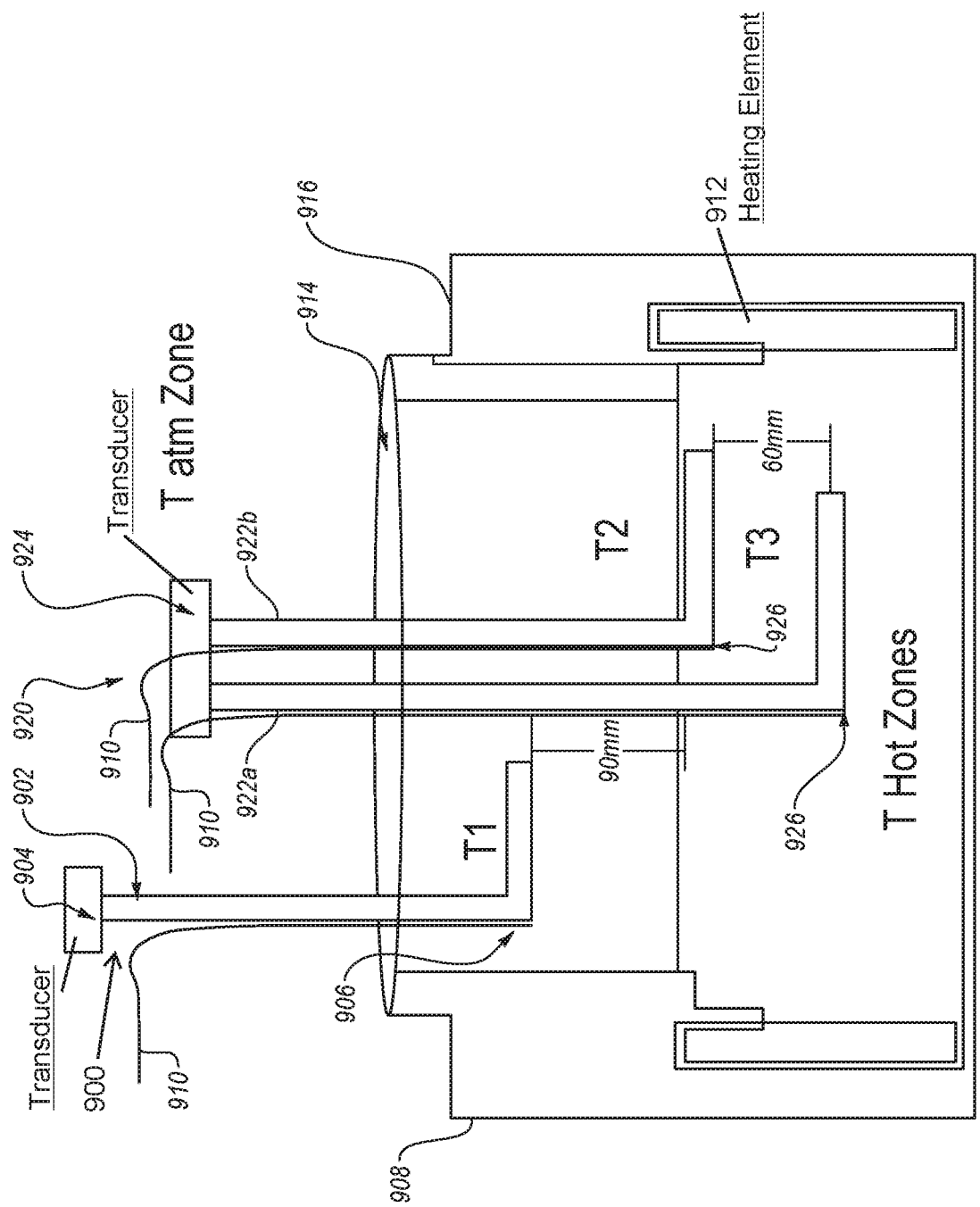

FIG. 9A includes a diagram showing the multiple L bend waveguides of the same material (Chromel) for measurement the properties of the fluids.

FIG. 9B includes another diagram showing the different high temperature, materials A, B, and C.

Figure 10:
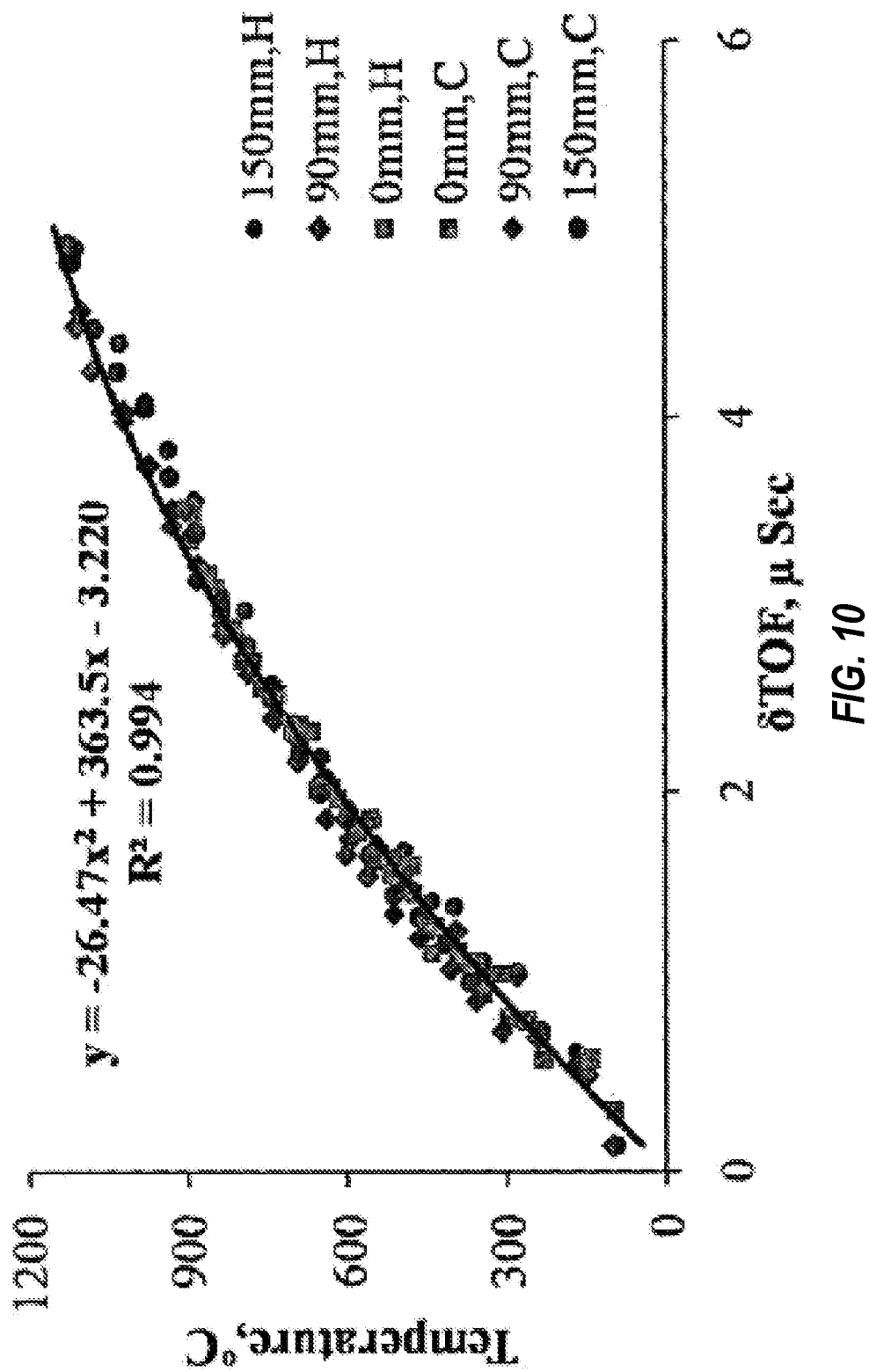

FIG. 10 shows the δTOF for the L (0,1) mode vs temperature measured at the heating (H) and cooling (C) cycles, using multiple Chromel wave guides, then the polynomial fit curve.

DETAILED DESCRIPTION OF THE INVENTION

The invention described herein uses unique embodiments of an ultrasonic waveguide to determine the following properties of a solid material that forms the waveguide that is encased in a fluid media with known properties: Moduli (both Normal and Shear moduli) as a function of temperatures; and Density as a function of temperature.

Further, once the solid media is characterized, the temperature dependent properties of the fluid are measured that include the following properties: Viscosity of the fluid; Density of the fluid; Temperature of the fluid; and Surface level of the fluid.

Further, using multiple waveguides, the gradients in the above properties can be measured.

This invention describes a waveguide based technique with special modifications to the end of the waveguide to obtain reliable reflected ultrasonic signals from the end of the waveguide. The waveguide is inside a heating chamber (such as controlled furnace), and the interpretation of the reflected signals leads to a quantitative measurement of mechanical properties of the waveguide material, such as Young's and Shear Moduli, Density and the properties of the fluid surrounding the waveguide, such as viscosity, density, level and temperature of the fluid.

Ultrasonic waveguides, with unique embodiments to the end of the waveguides, have been used here for accomplishing multiple measurements as described below.

When the end of the waveguide is in a known media (for instance Air or Vacuum) the technique is capable of measuring the mechanical properties of the waveguide, including the Young and Shear moduli and density. When the end of the waveguide is in an unknown fluid media, the technique is capable of measuring the mechanical properties of the fluid, including viscosity, density, and temperature. When the sensor (e.g., waveguide coupled at one end to ultrasonic transducer) is used in conjunction with a temperature controlled chamber, the dependencies of these measured properties to temperature can be obtained. The technique uses guided ultrasonic wave modes that are generated using an ultrasonic transducer at one end of the waveguide, travel along the length of the waveguide, interact with the second end of the waveguide(s), and are reflected back to the one end of the waveguide from the second end. The second end of the waveguide(s) has unique embodiments that permit multiple interactions between the ultrasonic wave and the embodiment. The reflected signal from the second end are detected and recorded using an ultrasonic transducer and associated instrumentation. The necessary ultrasonic amplitudes and time of flights are obtained from the reflected signal and the properties of the waveguide material and the surrounding fluid are calculated.

The system, in one aspect, is novel in the configuration, which includes a plurality of bends and/or notches at one end, and thereby the method is novel in that the path being created in the waveguide includes a plurality of bends and/or notches at one end. The feature including the designing in the end, for example in a very simple case, it will be one bend or one notch, which provides a reference signal that allows the user to improve the measurement and makes the system and method robust. In a more sophisticated measurement, it can be designed either with multiple notches/bends, or any other non-linear turns/paths/features or other forms of features that can be machined/modified in the measurement end of the waveguide to provide either improved measurement capability, or capability to measure many properties simultaneously, or improve the robustness or the measurements, or use these features to make measurements at multiple positions using the same waveguide. This is the key feature in the disclosure which includes the system and the method.

Figure 1B:
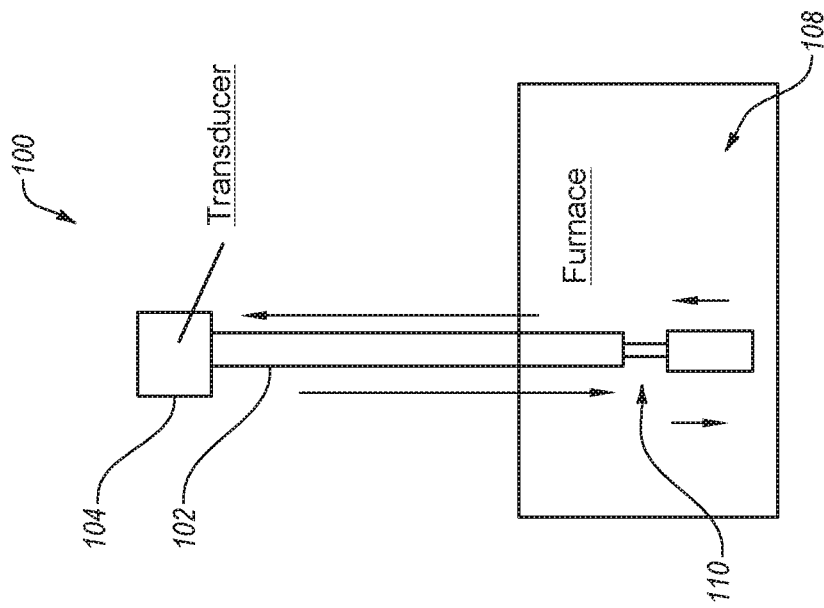
FIGS. 1A to 1D show some of the typical embodiments of the transducer coupled to the end of the waveguide.
Figure 1A:
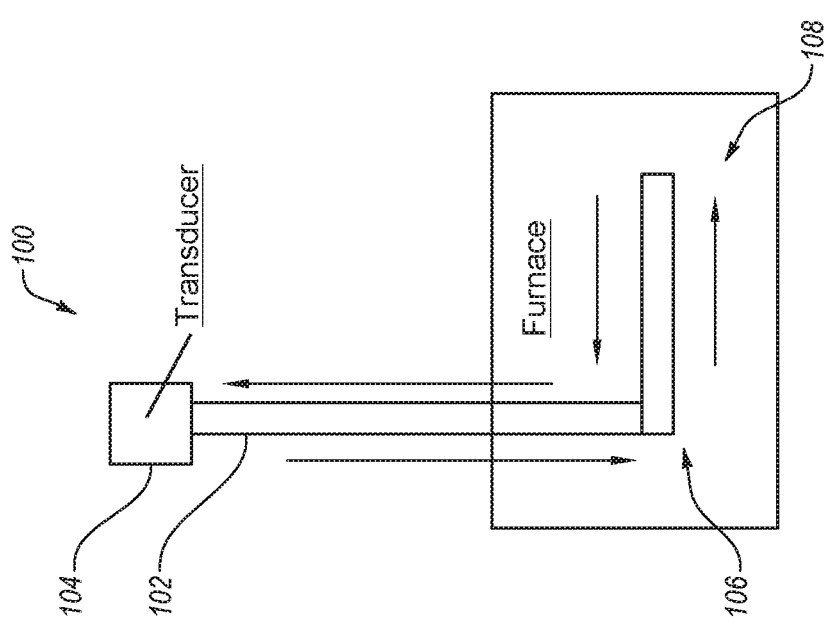
Figure 1D:
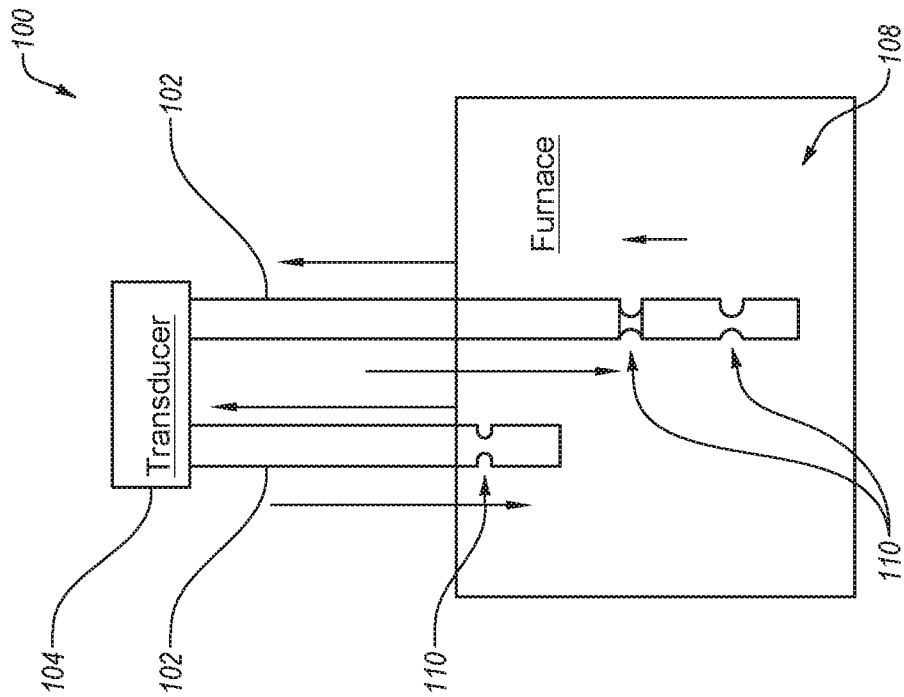
Figure 1C:
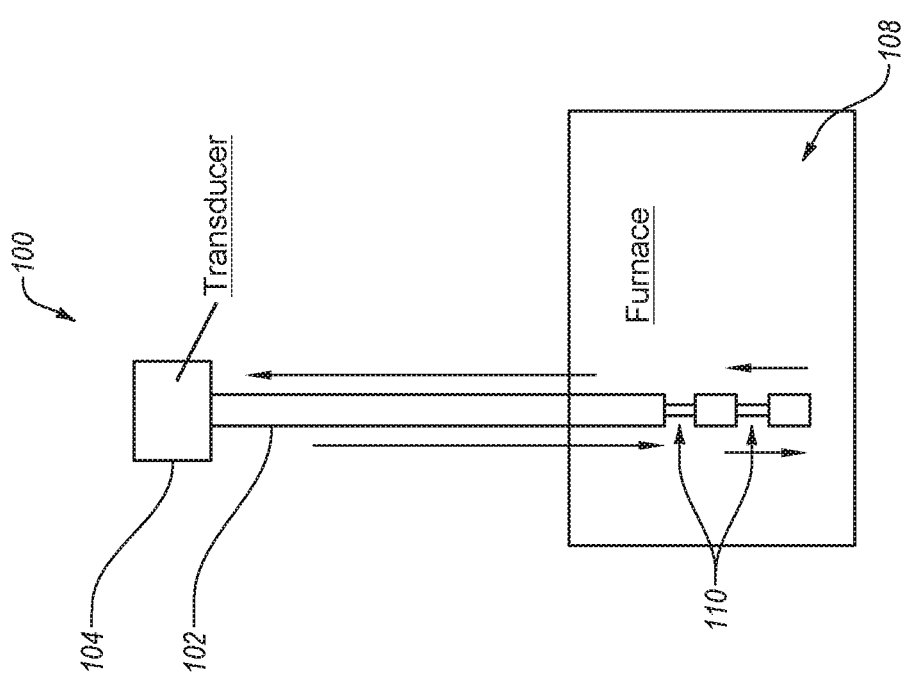

FIGS. 1A to 1D: Some of the typical embodiments to the end of the waveguide are shown in FIGS. 1A, 1B, 1C and 1D. FIG. 1A shows a sensor 100 that includes a waveguide 102 coupled at one end to an ultrasonic transducer 104, where the waveguide 102 has a bend 106 (e.g., L shaped) that is in a furnace 108. FIG. 1B shows a sensor 100 that includes a waveguide 102 coupled at one end to an ultrasonic transducer 104, where the waveguide 102 has a notch 110 that is in a furnace 108. FIG. 1C shows a sensor 100 that includes a waveguide 102 coupled at one end to an ultrasonic transducer 104, where the waveguide 102 has a plurality of notches 110 that are in a furnace 108. FIG. 1D shows a sensor 100 that includes two waveguides 102 coupled at one end to an ultrasonic transducer 104, where the waveguides 102 have a plurality of notches 110 that are in a furnace 108.

Figure 2:
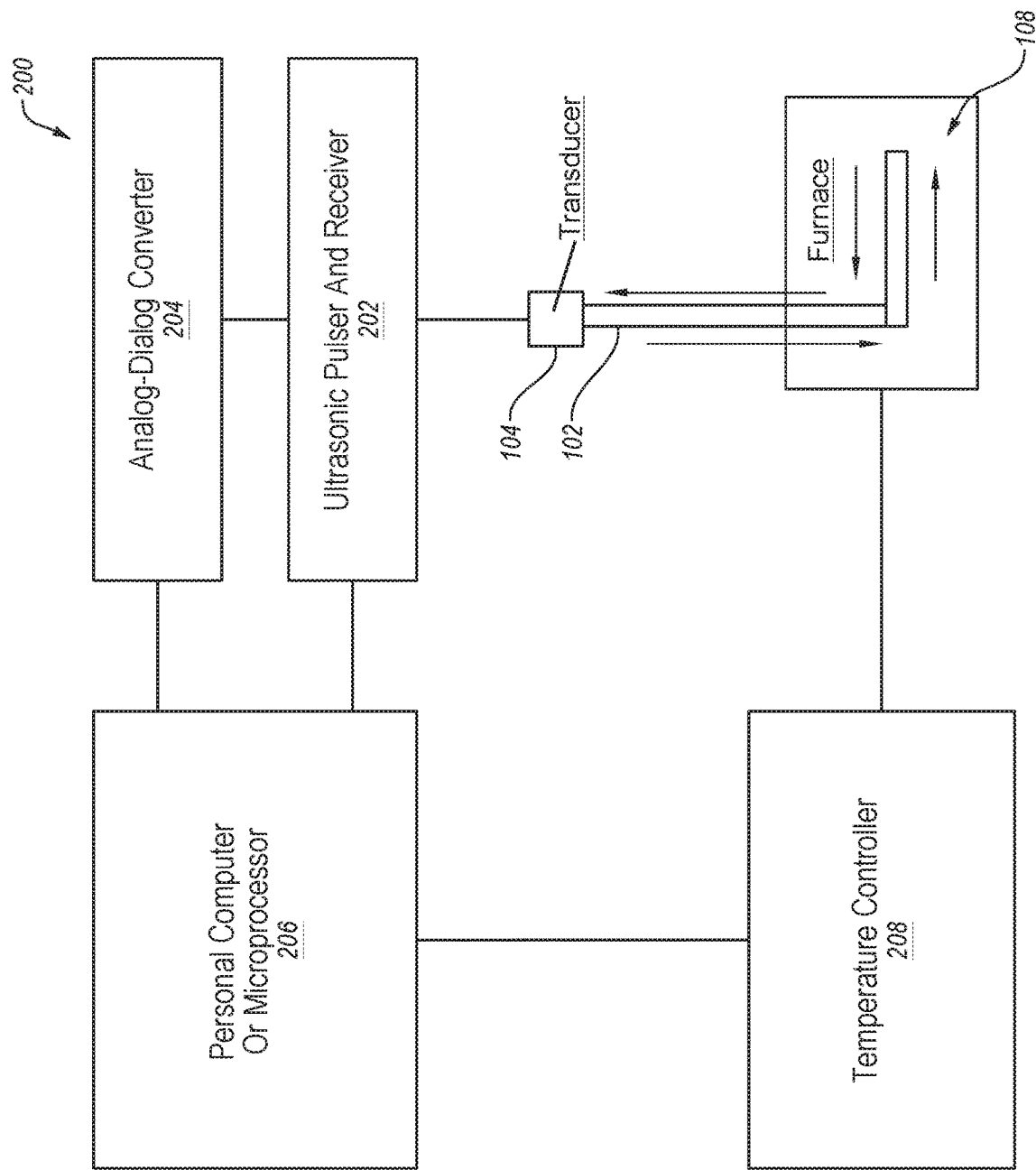
FIG. 2 shows a typical instrumentation for the data collection.

FIG. 2: A typical instrumentation for the data collection is shown in the figure. FIG. 2 shows a system 200 having the sensor 100 of FIG. 1 having the ultrasonic transducer 104 operably coupled with an ultrasonic pulser and receiver 202. The ultrasonic pulser and receiver 202 is operably coupled with an analog-digital converter 204 and to a personal computer or microprocessor 206. The analog-digital converter 204 is also operably coupled to the personal computer or microprocessor 206. The personal computer or microprocessor 206 is operably coupled to a temperature controller 208 that is operably coupled to the furnace 108. However, the microprocessor and FPGA based hardware can be used to replace many of the instrumentation functionalities. Typical instrumentation block diagram for the sensor data collection.

One of the typical modes of excitation of the guided wave modes in the waveguide is through using a Piezoelectric Crystal based transduction. The excitation of the desired wave modes will depend on the relative position of the crystal, the orientation of the piezoelectric domain coordinates (which influences the surface tractions provided by the transduction). The generation of several guided wave modes is feasible including T(0,1), L(0,1), L(0,2), F(1,1), etc. all of which can be used in the sensing. While the piezo-electric method is a typical method of generation, other modes such as electromagnetic, laser based, thermo-electric, etc. are also equality applicable.

FIGS. 3A, 3B, 3C, 3D, and 3E show some typical positioning of the piezo-electric based transducers 304 on the waveguides 302. The vibration of the piezo crystal is shown. FIGS. 3A, 3B, 3C, 3D, and 3E show some of the typical combinations of the Piezo-crystal vibrations and position of the crystal with respect to the waveguide orientation.

The experiments have been conducted for the determination of (a) Normal Moduli (E), (b) Shear Moduli (G) and temperature and temperature gradients using the waveguide (e.g., part of sensor along with transducer) made of a rod (e.g., waveguide) made of a high temperature material. The time of flight of the signal of the ultrasonic guided wave that travels along the length of the waveguide, reflects due to the features at the end of the waveguide and returns back to the transducer was employed in the sensing. The waveguide part of the sensor (e.g., transducer and waveguide) was placed inside a furnace and thermocouples were used for verification of temperature measurement purposes.

FIG. 4A shows a sensor 400 having a waveguide 402 using an L bend 406 that was employed in the study reported here. L is 545 mm, L1 is 128.5 mm, L3 (e.g., L+L1) is 673.5 mm, and d is 2.3 mm. The ultrasonic transducer 404 is shown on a first end of the waveguide 402.

The sensor along with a holder for the piezo-crystal transducer for the generation of the ultrasonic wave modes is shown in FIG. 4B. FIG. 4B shows the sensor 420 having the sensor locking screw 421, protection plate 422, connector 423, insulation 424, transducer 425, waveguide holder 426, waveguide locking screw 427, different slots 428, and waveguide 429, wherein the waveguide 429 has a first region 430 and second region 431 separated by a bend 432.

A typical time domain signal (also called an A-scan signal) is shown in the FIG. 4C. The two signals, one reflected from the bend region and the other reflected from the end of the waveguide, is observed in the A Scan signal at times of flight that represents the duration of travel to and fro from the transducers to the region of reflection.

A typical L bent waveguide with the probe and waveguide holder is shown in FIG. 4B. Typical ultrasonic RF signal obtained by the transducer showing the reflected signal from the bend and the end of the waveguide is shown in FIG. 4C.

The time of flight will depend on the velocity of the wave mode and coefficient of expansion. If the waveguide is surrounded by a fluid that has a gradient in the temperature, the difference in the time of flight between the end of the waveguide reflected signal and the bend reflected signal will be invariant to temperature gradients (since the bend region is in a uniform temperature region).

The difference in the time of fight (DTOF) measurement is used for the calculation of E or G. The L(0,1) mode of the guided wave is used for the calculation of E and the T(0,1) is used for the measurement of G and a standard thermocouple is used for measurement of temperature by using the thermocouple near to the bend in the waveguide. Once the E and the G values are found as a function of temperature, the waveguide can be used for the measurement of the properties of the fluid such as temperature, viscosity and density.

A typical result obtained using a waveguide of circular cross-section (rod, wire) of 2.3 mm diameter made from Inconel-690 (a high temperature material commonly used in making up of thermocouples) was employed for the measurement. A furnace was employed with a temperature controller. Measurements were taken and the δTOF was calculated from the signals during both the heating and the cooling cycles of the furnace. The data in the temperature range of 30 to 1100° C. is shown in FIG. 5 for the L(0,1) wave mode.

FIG. 5: The δTOF for the L (0,1) mode vs temperature as measured using thermocouples and the polynomial fit curve.

Using this information, the E vs Temperature for the material is derived as shown in the Plot marked as FIG. 6. The δTOFs measured in the previous plot are used here to derive the E moduli values. The experimentally derived values for E were then compared with the values available in the literature (Table 4, page 2 from Publication Number SMC-079, Copyright © Special Metals Corporation, 2009 (October 09)) and was found to be in excellent agreement.

FIG. 6: The E vs Temp for Inconel-690 as measured using the L(0,1) mode waveguide sensor made from Inconel-690. Two separate experimental measurements are shown here and compared with data obtained from literature (Table 4, page 2 from Publication Number SMC-079, Copyright © Special Metals Corporation, 2009 (October 09)).

The δtofs' using the T(0,1) mode for the same material is shown in FIG. 7 for the heating and the cooling cycles in the same temperature range. Due to the slower velocity of the T(0.1) mode, the δtofs values are relatively higher (as anticipated)

FIG. 7: The δtof for the T(0,1) mode vs temperature as measured using thermocouples and the polynomial fit curve.

The G vs. Temp curve for the material Inconel-690 and a comparison between the measurements and data from Literature is shown in FIG. 8.

FIG. 8: The G vs Temp for Inconel-690 as measured using the T(0,1) mode waveguide sensor made from Inconel-690. Two separate experimental measurements are shown here and compared with data obtained from literature (Table 4, page 2 from Publication Number SMC-079, Copyright © Special Metals Corporation, 2009 (October 09)).

Once the local material properties such as Temperature, Viscosity, Density, etc. of the surrounding fluid can be measured using measurements of a single waveguide, Gradients in the properties of the fluid can be ascertained using multiple waveguides as shown in the figure below. The bend regions are located at appropriate heights in order to measure local material properties. Both difference in time of flight and Amplitude ratio (amplitude of the signal from the bend region divided by the amplitude from the waveguide end) will be used in the measurement of the fluid properties.

FIG. 9A: Diagram showing the multiple L bend waveguides of the same material (Chromel) for measurement of the properties of the fluids. FIG. 9A shows the sensor 900 (e.g., 0.5 MHz) having the waveguide 902 coupled with the transducer 904. The waveguide 902 includes a bend 906 that is in a heating device 908. A thermocouple 910 is associated with the waveguide 902. The heating device 908 is shown to have different temperature regions labeled as T, T1, T2, and T3. T is a hot zone. Tatm is the temperature outside the heating device 908. The heating device 908 includes heating elements 912 along with a thin silicon tube 914 and insulation 916.

FIG. 9A also shows a sensor 920 (e.g., 0.5 MHz) having two different waveguides 922a, 922b coupled with the transducer 924. Each waveguide 922a, 922b includes a bend 926 that is in a heating device 908. The vertical distance from the bend 906 of the waveguide 902 is 90 mm to the bend 926 of the waveguide 922a. The vertical distance from the bend 926 of the waveguide 922a is 60 mm to the bend 926 of the waveguide 922b. A thermocouple 910 is associated with each waveguide 922a, 922b.

FIG. 9B shows another diagram showing the different high temperature, materials 952a, 952b, and 952c. FIG. 9B shows the sensor 950 having three different waveguides 952a, 952b, and 952c all coupled with the ultrasonic transducer 954.

FIG. 10: The δTOF for the L(0,1) mode vs temperature are measured at heating (H) and cooling (C) cycles, using multiple Chromel wave guides, then obtaining the polynomial fit curve.

The invention discloses a method for measuring mechanical properties of a solid material using guided ultrasonic wave modes. The method is novel in using the solid material which itself forms the waveguide encased in a fluid media. The method shall include the first step of generating plurality guided ultrasonic wave modes using an ultrasonic transducer at one end of the wave guide, which plurality of waves travel in different path along the length of waveguide to interact with a corresponding end of the waveguide and gets reflected there from. Thereafter, a plurality of ultrasonic amplitudes and time of flights from the plurality of reflected signals are detected and analyzed for calculating a plurality of properties of the waveguide material and the surrounding fluid using detected plurality of ultrasonic amplitudes and time of flights.

In another aspect, the material may be a solid or a fluid.

In another aspect, the properties that are identified shall be many which include at least physical properties such as elastic properties, viscoelastic properties of the material, density, viscosity and temperature over a range of temperatures. In fact, the system works on, a very wide range of temperatures.

In another aspect, the invention discloses arranging a plurality of the processes occurring in sequence, which will provide gradients of properties of material means at least physical/elastic/viscoelastic properties of the material, density, viscosity and temperature over a range of temperatures.

In another aspect, the invention includes a system for operating a novel method for measuring mechanical properties of a solid material using standard ultrasonic wave modes characterized in the solid material which forms the waveguide encased in a fluid media. It comprises of positioning an ultrasonic transducer at one end of the wave guide to generate a plurality of ultrasonic wave modes, each of which waves travel in different paths along the length of waveguide and get reflected there from. The system also includes a plurality of sensors for detecting a plurality of ultrasonic amplitude and time of flights from the plurality of reflected signals. There is a processor means for analyzing and calculating a plurality of properties of the wave guide material and the surrounding fluid. As in the method, the other aspects of the invention are equally applicable as the material maybe a solid or a fluid and a range of, mechanical properties can be identified with the system. The system works over a wide range of temperature and number of systems can be arranged. The system may comprise of plurality of systems which will provide gradients of properties of material means at least physical/elastic/viscoelastic properties of the material, density, viscosity and temperature over a range of temperatures.

Some of the salient features that have been acquired in the product are the following.

The sensor will quantitatively measure the elastic properties including the Young's moduli, Shear Moduli, Poisson's Ratio, Bulk Moduli of the material as a function of temperature.

The sensor will quantitatively measure the density of the material as a function of temperature.

The sensor will measure the properties of the inviscid and viscous fluids in contact with the outside surface or the inside surface of waveguide including viscosity, temperature, and density.

The sensor, when used in multiple numbers, will measure the gradients/profiles of the properties of the waveguide material and the fluid.

More than one of these properties can be obtained simultaneously from the same experiment.

The waveguide may be in the form of a solid rod, wire, plate, sheet, etc., or hollow tube, pipe, shell, etc.

The guided wave modes employed can be of the Longitudinal (L(m,n)), Torsional (T(m,n), Flexural (F(m,n)), Anti-Symmetric (A(m)), Symmetric (S(m)), Shear Horizontal (SH(m)), etc.

The guided waves may be generated and received using one or more of the different mechanisms of guided wave generations including Piezo-electricity (longitudinal and shear modes), Electro-Magnetic transduction (Magnetostriction, Lorentz Force, EMF, etc.), Thermal mechanisms (e.g. pulse laser), Microwave, etc.

Applications and commercialization of the invention is very critical and have high utility value.

The temperature dependent property measurements are currently obtained using very sophisticated, time consuming, and expensive methods. The current sensor design allows for these measurements to be made relatively inexpensively and in short time duration without the development of a sophisticated experimental apparatus.

This technology can prove to be very critical to process industries and industries involved in high temperature processes. Industries could include power plants, refineries, chemical and fertilizer industries, etc. The technology can provide the industry with a rapid and low-cost approach for measuring vital material properties of metals/ceramics/etc. as a function of temperature. This will allow the industry to improve the design process of their components and plants. Additionally, manufacturing industries that mold, form, forge materials will also have interest in this technology.

The disclosure is to the extent as possible by the inventors in terms of descriptions and embodiments for the purpose of easy understanding when read by the skilled persons in the art. None of the embodiments/illustrations/examples shall be limiting on the scope of invention. The scope of invention is as per the descriptions and the claims annexed to this application.

We claim:

1. A method for measuring mechanical properties of a material, the method comprising:
   providing a waveguide formed from a solid material that has an ultrasonic transducer at a first end opposite of a second end of the waveguide;
   placing at least a portion of the waveguide in a fluid;
   generating a plurality of guided ultrasonic wave modes using the ultrasonic transducer;
   providing the plurality of guided ultrasonic wave modes to the first end of the waveguide, wherein the plurality of guided ultrasonic wave modes travel in different paths along a length of the waveguide to interact with the second end of the waveguide and/or features of the waveguide, and the plurality of guided ultrasonic wave modes get reflected as a plurality of reflected signals from the second end of the waveguide and/or the features of the waveguide, wherein the features include bends and/or notches in the waveguide;
   receiving the plurality of reflected signals with the ultrasonic transducer;
   detecting a plurality of ultrasonic amplitudes and a plurality of times of flight from the plurality of reflected signals with the ultrasonic transducer;
   calculating, with a processor, a plurality of properties of the solid material using the detected plurality of ultrasonic amplitudes and plurality of times of flight of the plurality of reflected signals; and
   defining the solid material to have the plurality of properties.

2. The method of claim 1, wherein the plurality of properties include at least physical properties selected from Young's moduli, shear moduli, and/or density.

3. The method of claim 2, further comprising:
   providing a plurality of waveguides formed from the solid material, where each waveguide includes a corresponding ultrasonic transducer;
   placing at least a portion of each waveguide into a fluid;
   generating a plurality of guided ultrasonic wave modes using the ultrasonic transducers;
   providing the plurality of guided ultrasonic wave modes to a first end of each of the plurality of waveguides, which plurality of guided ultrasonic wave modes travel in different paths along a length of each of the waveguides to interact with a second end of each of the waveguides and/or features of each of the waveguides, and the plurality of guided ultrasonic wave modes get reflected as a plurality of reflected signals from the second end and/or features of each of the waveguides, wherein the features include bends and/or notches in each of the waveguides;
   receiving the plurality of reflected signals with the ultrasonic transducer;
   detecting a plurality of ultrasonic amplitudes and a plurality of times of flight from the plurality of reflected signals in the plurality of waveguides with the ultrasonic transducer; and calculating the plurality of properties of the solid material of each of the waveguides using the detected plurality of ultrasonic amplitudes and plurality of times of flight of the plurality of reflected signals; and defining the solid material to have the plurality of properties.

4. The method of claim 3, further comprising determining gradients of the plurality of properties of the solid material.

5. The method of claim 2, further comprising:
once the plurality of properties of the solid material are defined and properties of the fluid are unknown, determining properties of the fluid with the waveguide, ultrasonic transducer, and processor, wherein the properties of the fluid include viscosity and density; and
providing the properties of the fluid.

6. The method of claim 5, further comprising:
determining the properties of the fluid across a range of temperatures; and
providing the properties of the fluid across the range of temperatures.

7. The method of claim 1, wherein the waveguide includes at least one bend between the first end and the second end.

8. The method of claim 1, wherein the waveguide includes at least one notch between the first end and the second end.

9. The method of claim 1, wherein the waveguide includes at least one bend and at least one notch between the first end and the second end.

10. The method of claim 1, further comprising:
placing at least a portion of the waveguide in a furnace;
controlling a temperature of the furnace across a range of temperatures;
detecting the plurality of ultrasonic amplitudes and plurality of times of flight across the range of temperatures under the temperature control by the furnace; and
determining the plurality of properties across the range of temperatures.

11. The method of claim 1, further comprising:
placing at least a portion of the waveguide in a furnace;
controlling a temperature of the furnace;
detecting the plurality of ultrasonic amplitudes and plurality of times of flight under the temperature control by the furnace; and
determining the plurality of properties for the controlled temperature.

12. The method of claim 1, further comprising:
placing at least a portion of the waveguide into a second fluid, wherein the second fluid has unknown properties; and
measuring properties of the second fluid with the waveguide, ultrasonic transducer, and processor.

13. The method of claim 12, wherein the measured properties of the second fluid include viscosity and density.

14. The method of claim 13, further comprising:
placing at least a portion of the waveguide in a furnace;
controlling a temperature of the furnace across a range of temperatures;
detecting the plurality of ultrasonic amplitudes and plurality of times of flight across the range of temperatures under the temperature control by the furnace; and
determining the properties of the second fluid across the range of temperatures.

15. A system for measuring mechanical properties of a material the system comprising:
a solid material in the form of a waveguide having a first end and an opposite second end;
a known fluid having at least a portion of the waveguide;
an ultrasonic transducer positioned at the first end of the waveguide, wherein the ultrasonic transducer is configured to generate a plurality of ultrasonic wave modes and provide each of the wave modes to the first end of the waveguide so as to travel in different paths along a length of the waveguide, and the wave modes get reflected as a plurality of reflected signals from the second end of the waveguide and/or from features of the waveguide, wherein the features include bends and/or notches in the waveguide;
wherein the ultrasonic transducer is configured for detecting a plurality of ultrasonic amplitudes and a plurality of times of flight from the plurality of reflected signals; and
a processor configured for calculating and providing a plurality of properties of the solid material of the waveguide using the detected plurality of ultrasonic amplitudes and plurality of times of flight, the processor being operably coupled with the ultrasonic transducer.

16. The system of claim 15, wherein the plurality of properties include at least physical properties selected from Young's moduli, shear moduli, and/or density.

17. The system of claim 15, further comprising a plurality of the waveguides, each waveguide having an ultrasonic transducer at the first end.

18. The system of claim 17, wherein the plurality of waveguides includes different types of waveguides.

19. The system of claim 15, wherein the waveguide includes at least one bend between the first end and the second end.

20. The system of claim 15, wherein the waveguide includes at least one notch between the first end and the second end.

21. The system of claim 15, wherein the waveguide includes at least one bend and at least one notch between the first end and the second end.

* * * * *